United States Patent [19]

Hong

[11] Patent Number: 5,545,337
[45] Date of Patent: Aug. 13, 1996

[54] CERAMIC COATING SYSTEM OR WATER OXIDATION ENVIRONMENTS

[75] Inventor: Glenn T. Hong, Tewksbury, Mass.

[73] Assignee: Modar, Inc., Natick, Mass.

[21] Appl. No.: 346,144

[22] Filed: Nov. 29, 1994

[51] Int. Cl.$^6$ .................................................. C02F 1/72
[52] U.S. Cl. ........................... 210/761; 210/762; 422/7; 422/240
[58] Field of Search ........................ 210/761, 762, 210/763, 766, 908; 422/240, 241, 7

[56] References Cited

U.S. PATENT DOCUMENTS

| | | | |
|---|---|---|---|
| 3,719,519 | 3/1973 | Perugini | 422/241 |
| 4,065,492 | 12/1977 | Spielberger et al. | 422/240 |
| 4,154,897 | 5/1979 | Shimogori et al. | 422/241 |
| 4,294,706 | 10/1981 | Kakihara et al. | 210/762 |
| 4,384,959 | 5/1983 | Bauer et al. | 210/761 |
| 4,751,005 | 6/1988 | Mitsui et al. | 210/759 |
| 5,358,645 | 10/1994 | Hong et al. | 210/761 |
| 5,384,051 | 1/1995 | McGinness | 210/761 |

OTHER PUBLICATIONS

Hazlebeck et al., "Supercritical Water Oxidation of Chemical Agents, Solid Propellants, and other DOD Hazardous Wastes", General Atomics, Mar. 1993.

Downey et al., "Corrosion and Chemical Agent Destruction Investigations of the Supercritical Water Oxidation of Hazardous Military Wastes", Prepared for Presentation at the AICHE 1994 Annual Meeting; Reactions in Supercritical Fluids, Nov 1994.

*Primary Examiner*—Peter A. Hruskoci
*Attorney, Agent, or Firm*—Nydegger & Associates

[57] ABSTRACT

A process for water oxidation of combustible materials in which during at least a part of the oxidation corrosive material is present and makes contact with at least a portion of the apparatus over a contact area on the apparatus. At least a portion of the contact surface area comprises titanium dioxide coated onto a titanium metal substrate. Such ceramic composites have been found to be highly resistant to environments encountered in the process of supercritical water oxidation. Such environments typically contain greater than 50 mole percent water, together with oxygen, carbon dioxide, and a wide range of acids, bases, and salts. Pressures are typically about 27.5 to about 1000 bar while temperatures range as high as 700° C. The ceramic composites are also resistant to degradation mechanisms caused by thermal stresses.

20 Claims, 2 Drawing Sheets

CERAMIC COATING SYSTEM OR WATER OXIDATION ENVIRONMENTS

This invention was made with Government support under Subcontract No. C94-170508 awarded by the Department of Energy. The Government has certain rights in this invention.

BACKGROUND OF THE INVENTION

The process of wet oxidation has been used for the treatment of aqueous streams for over thirty years. See, for instance, U.S. Pat. No. 2,665,249 which discloses oxidation of carbonaceous dispersions in an aqueous phase.

Wet oxidation involves the addition of an oxidizing agent, typically air or oxygen, to an aqueous stream at elevated temperatures and pressures, with the resultant "combustion" of oxidizable materials directly within the aqueous phase. The wet oxidation process is characterized by operating pressures of 30 to 250 bar (440 to 3630 psia) and operating temperatures of 150° to 370° C. Since gas phase oxidation is quite slow at these temperatures, reaction is primarily carried out in the liquid phase. Thus, the reactor operating pressure is typically maintained at or above the saturated water vapor pressure, so that at least part of the water is present in liquid form.

Conventional wet oxidation suffers several disadvantages. First, it is limited by the degree of oxidation attainable. Second, it is unable to adequately handle refractory compounds. Third, reaction times are often too slow for industrial use. Interest therefore grew for the extension of wet oxidation to higher temperatures and pressures.

In U.S. Pat. No. 2,944,396 is described the addition of a second oxidation stage after the wet oxidation process. Unoxidized volatile combustibles accumulating in the vapor phase of the first (wet oxidation) stage are sent to a second stage operated at temperatures above the critical temperature of water of about 374° C.

U.S. Pat. No. 4,292,953 discloses a modified wet oxidation process for power generation from coal and other fuels in which, as heat is liberated by combustion, the entire reaction mixture exceeds the critical temperature of water, with operating pressures of about 69 bar (1000 psi) to about 690 bar (10,000 psi) spanning both the sub- and supercritical water pressure ranges.

The wet oxidation process set forth in U.S. Pat. No. 4,338,199 has come to be known as "supercritical water oxidation" (SCWO) since oxidation is frequently conducted entirely at supercritical conditions in temperature (i.e., greater than 374° C.) and pressure (greater than about 3200 psi or 220 bar). SCWO is capable of completely oxidizing virtually any organic compound in a matter of seconds at temperatures between about 500° to about 600° C. and pressures of about 250 bar.

A related process known as supercritical temperature water oxidation (STWO) provides similar oxidation effectiveness for certain feedstocks but at lower pressure. This process was recently described in U.S. Pat. No. 5,106,513 and utilizes temperatures in the range of 600° C. and pressures between about 25 to about 220 bar. For selected feedstocks, the combination of more modest temperatures (in the range of 400° to 500° C.) but higher pressures (up to 1000 bar or 15,000 psi) has proven useful to keep certain inorganic materials from precipitating out of solution. See, for example, Buelow, S., "Reduction of Nitrate Salts under Hydrothermal Conditions", Proceedings of the 12th International Conference on the Properties of Water and Steam, ASME, Orlando, Fla., September, 1994.

Various processes for oxidation in an aqueous matrix will hereinafter be referred to collectively as high temperature water oxidation (HTWO) if carried out at temperatures above about 300° C. and pressures of about 27.5 bar. The HTWO environment will be described below for the specific case of SCWO, though other HTWO environments will have much in common.

SCWO may be compared to incineration processes since its efficiency towards oxidizable materials is almost 100%. Indeed, much of the process development to date in SCWO has been directed toward treatment of sludges or toxic and hazardous wastes. Such materials could likewise be subjected to an incineration process.

Other potential feedstocks for the SCWO process include those wastes which are currently being handled by deep well injection techniques and wastes which have either been accumulated or spilled, including mixed radioactive/organic wastes. Due to the wide variety of potential feedstocks, the use of SCWO processes spans virtually the entire periodic table.

The products of complete oxidation in SCWO are fairly well known. Carbon and hydrogen form the conventional combustion products $CO_2$ and $H_2O$. Chlorinated hydrocarbons also give rise to HCl, which will react with available cations to form chloride salts. Alkali may be intentionally added to the reactor to avoid development of high concentrations of HCl.

In contrast to normal combustion, which forms $SO_2$, the final product of sulfur oxidation in SCWO is sulfate anion. As in the case of chloride, alkali may be intentionally added to avoid high concentrations of sulfuric acid. Similarly, the product of phosphorus oxidation is phosphate anion.

While it is frequently desirable to neutralize oxidation product anions via alkali addition, the reverse is not usually true. Feedstocks containing excess noncombustible cations are generally self-neutralized by the $CO_2$ which evolves from oxidation. For example, a stream containing organic sodium salts will yield sodium carbonate as a product. Ammonium, another common cation, is converted to water and nitrogen ($N_2$) or nitrous oxide ($N_2O$) in the SCWO process, and so does not require neutralization.

A key advantage of SCWO over incineration is the lack of $NO_x$ formation due to the relatively low temperature of operation. Oxidized forms of nitrogen, e.g., organic nitro-compounds and nitrate anion, have been found to form $N_2$ or $N_2O$. When air is used as the oxidizing agent, $N_2$ passes through the system as an inert.

While chemical equilibria under SCWO conditions has been fairly well characterized, much remains to be learned about chemical kinetics and reaction mechanisms. The situation is complicated by the wide range of densities which may exist in supercritical water systems. At typical reactor conditions of 500° to 600° C., the supercritical phase density is on the order of 0.1 g/cc. Reaction mechanisms are of the free radical type as with normal combustion, but are greatly affected by the higher density and water concentration which characterize SCWO conditions. On the other hand, at temperatures closer to the critical point, or in dense supercritical brine phases, densities of 0.5 to 1 g/cc are obtained and ionic reaction mechanisms dominate.

As indicated by the density employed under typical reactor conditions (0.1 g/cc), the distance between water molecules is considerably greater than the distance between molecules in normal liquid water. The disruption of hydrogen bonding causes the water molecules to lose the molecular ordering which is responsible for many of the properties of normal liquid water. In particular, solubility behavior approximates that of high pressure steam rather than that of liquid water. Smaller polar and nonpolar organic compounds, with relatively high volatility, exist as vapors at typical SCWO conditions, and hence are completely miscible with the supercritical water. Gases such as $N_2$, $O_2$, and $CO_2$ show similar miscibility. Larger organic compounds, such as polymers, pyrolyze to smaller molecules at typical SCWO conditions, thereby resulting in solubilization via chemical reaction. The loss of bulk polarity of the water phase has striking effects on normally water-soluble salts, as well. No longer readily solvated by water molecules, they precipitate out as solids or dense brines. The small salt residual in the supercritical phase is largely present in molecular form, e.g., as NaCl molecules. Heavy metal oxides, having low solubility in liquid water, retain their low solubility at supercritical water conditions. Exceptions exist and high solubilities occur, however, when a metal forms a volatile salt or oxide at reactor temperatures.

The characterization of solubility behavior in the preceding paragraph has been expressed in relation to pure supercritical water. In actual SCWO systems, this behavior may be greatly altered by the presence of large quantities of gases and salts. In many applications, for example, the mass of "noncondensible" gases in the reactor may exceed the mass of water. The presence of noncondensible gases and salts in the SCWO reactor encourages the separation of phases and is similar to the "salting out" phenomenon of gases from solution.

The complexity and uniqueness of the SCWO environment, combined with the elevated temperature and pressure requirements, presents a tremendous challenge in the selection of materials of construction for commercial applications. Numerous efforts have focused on metal alloys.

While stainless steel has proven suitable for research in dealing with mixtures of water, oxygen, and hydrocarbons, commercial systems are required to handle a variety of acidic and alkaline streams, as well as streams containing a significant quantity of salts. High nickel alloys, in particular Alloys C276 and 625, have been used in testing. However, unacceptably high corrosion rates are observed with these alloys for many streams of interest. Furthermore, prolonged exposure to and cycling of these materials at reactor temperatures leads to a degradation of their mechanical properties. Both alloys are subject to embrittlement, thereby leading to the increased possibility of cracking and catastrophic failure.

A large number of metals, alloys and ceramics have been tested. Most recently, U.S. Pat. No. 5,358,645 (herein incorporated by reference) disclosed the use of zirconia based ceramics for the contact surface area of an apparatus for high temperature water oxidation of combustible materials. As stated therein, the stable form of pure zirconium oxide between ambient temperature and 1170° C. is a monoclinic crystal.

As a consequence of the transformation of monoclinic zirconium oxide to its tetragonal form when heated above 1170° C., $ZrO_2$ is prone to fracturing under those thermal cycling conditions which typify high temperature processes. U.S. Pat. No. 5,358,645 discusses the use of stabilizing agents to increase the resistance of zirconium oxide to such fracturing. The most common stabilizing agents employed are yttria, magnesia, and calcia.

FIG. 1 shows how yttria alters the crystalline structure of the zirconia crystalline lattice. The basic crystalline forms of the zirconia crystal are monoclinic (M), tetragonal (T), and cubic (C). SS in FIG. 1 denotes a solid solution, i.e., the stabilizing element is integrated into the zirconia lattice. Above about 7.5 mole percent yttria, the zirconia is fully stabilized— only the cubic crystal form existing. Below about 1.5 mole % yttria, zirconia exists in its monoclinic form at room temperature. Yttria partially stabilized zirconia (YPSZ) exists at yttria mole percents between 1.5 and 7.5. At temperatures below 500° C., YPSZ contains a mixture of monoclinic, cubic, and metastable tetragonal phases. The metastable tetragonal phase has been shown to be of importance in reducing the ceramic's brittleness.

A potential drawback of zirconia coatings is the possibility of the transport of oxygen through the solid phase ceramic. Degradation may result as oxygen diffuses to the metallic bond coating, thereby forming metal oxides. The formation of such oxides could render a volumetric change and lead to coating spallation. In an effort to prevent this phenomenon, it is possible to include another ceramic such as alumina as an intermediate layer. An alumina layer would be impervious to oxygen. However, alumina is unsuitable as the uppermost layer for exposure to the SCWO environment since it is considerably less inert than zirconia in many cases.

A need continues to exist therefore for a coating which demonstrates greater resistance to SCWO conditions. In particular, a need exists for a coating which may be useful for those commercial streams which are chloride-bearing.

SUMMARY OF THE INVENTION

According to an embodiment of the present invention there is provided a process for high temperature water oxidation of combustible material in a high-temperature water oxidation apparatus, in which corrosive material is present and contacts the apparatus over a contact area on the apparatus. The process comprising contacting, in an aqueous phase, the combustible material and an oxidizing agent under conditions suitable to cause combustion of the combustible material. The oxidation is conducted at a temperature within the range of about 300° C. to about 700° C. and at pressures from about 27.5 bar (400 psi) to about 1000 bar (15,000 psi). The contact area comprises titania coated onto a titanium base metal.

According to another embodiment of the present invention there is provided an improvement to apparatus for high temperature water oxidation of combustibles at temperatures in excess of 300° C. and at pressures in excess of about 27.5 bar (400 psi), in which during at least a part of the oxidation, corrosive material is present and contacts at least a portion of the apparatus over a contact area on the apparatus. The improvement is characterized by a contact surface area comprising titania coated onto a titanium base metal.

Still another embodiment of the invention is directed to a graded coating of titanium dioxide which, when applied to a titanium metal substrate, is resistant to a wide range of SCWO environments. These environments include for example mineral acids, such as HCl and $H_2SO_4$, salts containing Na, K, Ca, Mg, Ce, Pb or Zn cations, dense brines, melts, and solid deposits of various salts. Environment temperatures have ranged from about 700° C. to subcritical temperatures (below 374° C.). The present invention further exhibits resistance to thermal cycling as well as degradation mechanisms caused by thermal stresses.

The coating of this invention may be employed in linings for reactors and pipes. In addition, the invention may be used as a coating in such elements as injection nozzles, filter housings, valve parts and fittings.

DETAILED DESCRIPTION OF THE INVENTION

Figure 1:
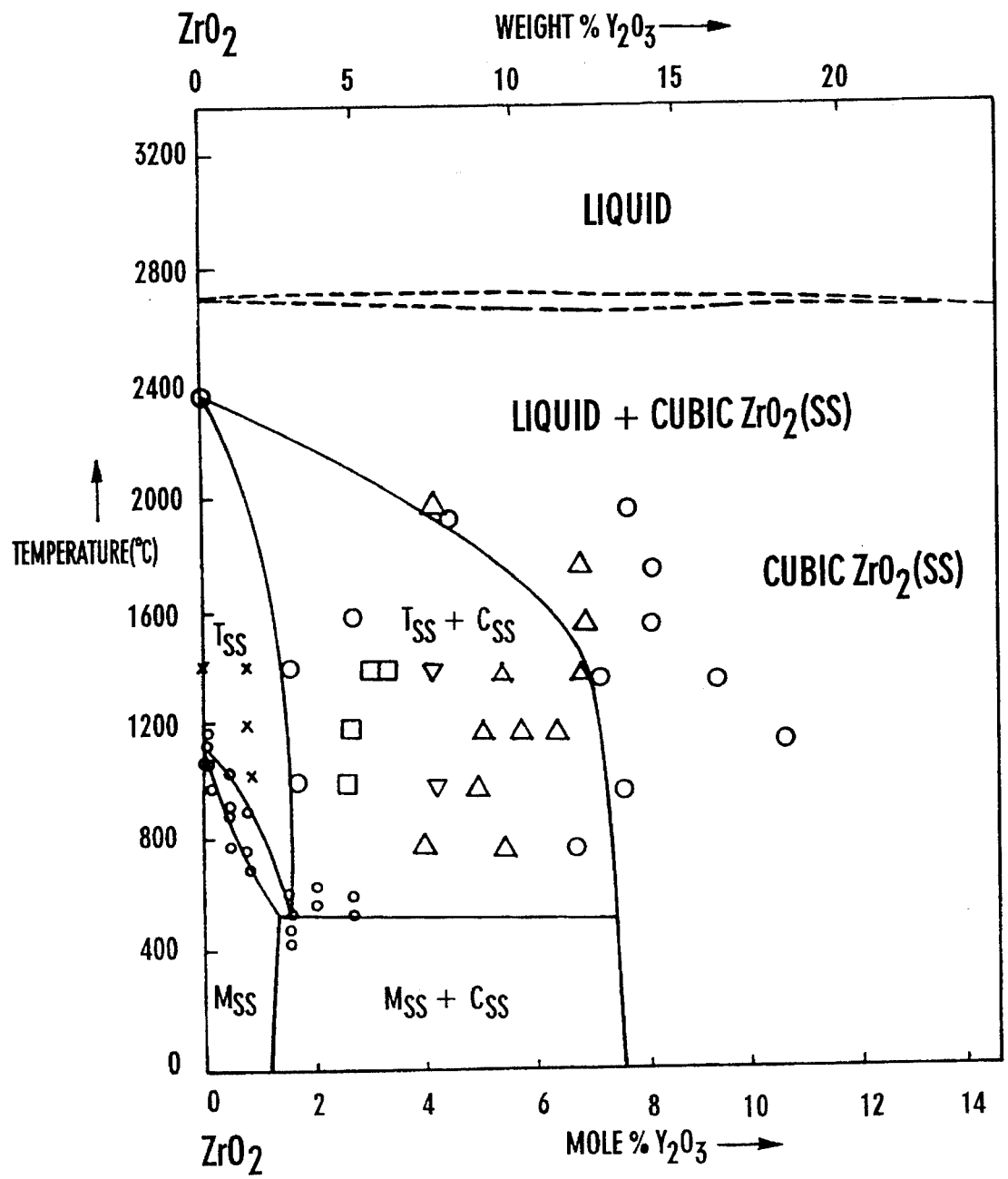
FIG. 1 is the equilibrium phase diagram for a zirconia-yttria system.

Generally, ceramics for use in chemical processes have the desirable characteristics of chemical inertness, superior thermal stability, and low thermal conductivity. Difficulty of fabrication and brittleness, however, frequently place severe limits on the applicability of ceramics. For this reason, means of coating ceramics on more versatile substrates such as metals has been examined.

One technique for fabricating such coatings is known as "thermal spray" and consists of heating a stream of powdered ceramic material to a temperature sufficient to partially melt the powder. The spray of partially melted powder impacts on the substrate and rapidly cools to form a sintered layer of solid. In the final composite, the ceramic layer protects the base metal from excessively high temperatures or aggressive chemical environments.

The ceramics of the present invention comprise a titanium dioxide coating applied onto a titanium metal substrate. The titanium substrate may be an alloy of titanium such as commercially pure titanium or an alloy containing titanium, aluminum and vanadium. The resulting ceramic composite is able to withstand the harsh conditions of the high temperature water oxidation process.

The composite ceramics of the invention are useful as materials of construction for any part of a high temperature water oxidation system that will be exposed to the harsh conditions of the process. Such systems typically contain greater than 50 mole percent water, together with oxygen, carbon dioxide, and a wide range of acids, bases, and salts. In particular, the ceramic composites of this invention have been found to be highly resistant to systems encountered in the process of supercritical water oxidation. They can be used in the construction of reactors, linings, pump parts, piping or tubing, nozzle parts, vessels, tanks, filters, baffles, valve parts and gaskets, for example.

Preferably, the composites of this invention are "graded" as is well known in the art so as to eliminate the possibility of delamination at high temperature. It is known that the titanium dioxide coating and the titanium metal substrate are characterized by different coefficients of thermal expansion. In other words, the thermal expansion coefficient for titanium metal substrate is slightly greater than the thermal expansion coefficient for the titanium dioxide coating. When heated from ambient to elevated operating temperature, differing dimensional changes between the base metal and the coating occurs such that delamination of the coating may develop.

To avoid the possibility of delamination, the titanium dioxide coating is graded, i.e., deposited in multiple layers in admixture with varying compositions of metal in order to mitigate the thermal expansion coefficient differences between adjacent layers. Such mixed layers of ceramic and metal are referred to as "cermet." Most preferably, the percentile change in thermal coefficients between successive layers is no greater than about 50%.

Spraying of the ceramic composite of this invention is typically preceded by the spraying of an all-metallic "bond coat" which has an thermal expansion coefficient intermediate to the base metal and the cermet. In addition, the "bond coat" is used to provide the titanium base metal with a rough surface conducive to good adhesion of the subsequently deposited cermet.

The ceramic composites of this invention find utility in a wide variety of high temperature water oxidation conditions. At temperatures above about 300° C., the environment of a water oxidation process is such that the ceramic composites are a very suitable material of construction. The ceramic composites of this invention are further suitable at a wide range of pressures ranging from the sub- to the supercritical of about 27.5 bar (400 psi) to above about 1,000 bar (15,000 psi).

The ceramic composites of this invention find utility in a wide variety of reactor systems, including vessel reactors, pipe reactors, and hydraulic column reactors (deep well reactors).

The chemical environment of supercritical water oxidation when used for waste processing will frequently include corrosive materials which comprise at least one moiety selected from the group consisting of Cl, $SO_4$, $NO_3$, $PO_4$, $BO_2$, Br, OH, $CO_3$ and at least one moiety selected from the group consisting of H, Na, K, Ca and Mg. Examples of such corrosive materials include the mineral acids HCl, $H_2SO_4$, $HNO_3$, and $H_3PO_4$, the alkaline materials NaOH and $Na_2CO_3$, and various salts with cations such as Na, K, Ca and Mg.

EXAMPLES

The examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

In the examples that follow, all coatings tested were thermally sprayed and were graded structures.

The Comparative Coatings—Zirconium Oxides. The comparative coatings which were tested were comprised of zirconium oxide. While yttria stabilized compositions are the most common thermally sprayed zirconias for use in thermal barrier applications, in SCWO environments concern exists over the chemical stability of yttria. Swab (U.S. Army Materials Technology Lab, Report No. MTLTR 90-4, 1990) has shown yttria stabilized zirconium oxide (YSZ) to be susceptible to reactions with water vapor at temperatures from 200° C. to 400° C. The most plausible explanation is the reaction of $H_2O$ with the $Y_2O_3$, as suggested by Lange, et al. (J. Am. Ceram. Soc., v. 69, p 237–240, 1986). Swab observed extensive YSZ degradation within 50 hours. However, the inventor has exposed YSZ materials to SCWO environments at 570° C. for as much as 44 hours, with no apparent attack. Based on this experience, and given the broad experience base which exists for thermally sprayed YPSZ, it was deemed worthwhile to test a YPSZ coating.

As described in U.S. Pat. No. 5,358,645, magnesia partially stabilized zirconia (MPSZ) with 3.5 wt % magnesia has received the most extensive successful testing in SCWO environments. This material, however, is not readily available in a powder form suitable for thermal spraying. The closest readily available composition—a 24 wt % magnesia stabilized zirconium oxide (MSZ), which contains a significant fraction of separate magnesia phase, was therefore used.

The Titania Coatings of this Invention. While limited testing of monolithic titania demonstrated reasonable performance, the resistance test results were not as favorable as those obtained for monolithic zirconia. Surprisingly however, the titania coating on titanium metal, with a titanium bond coat, demonstrated by far the best performance of all coatings tested. The titania-titanium system showed negligible degradation, while all other coatings exhibited significant attack within 120 hours. The titania powder used was Metco No. 102, supplied by the Sulzer-Metco Company, Westbury, N.Y.; of approximately 50 microns in diameter. The titania coatings as applied are black in color, and represent the anatase crystal form.

Identification of the Eight Tested Coating Systems. In accordance with the description set forth above, eight different coating systems were tested, as follows:

1. 7 wt % (approximately 4 mol %) YPSZ on Alloy 625, Nickel-Chrome-Aluminum (NiCrAl) bond coat.
2. 7 wt % YPSZ on Alloy 625, NiCrAl bond coat, alumina interlayer.
3. Titania on Alloy 625, NiCrAl bond coat.
4. Titania on Alloy 625, NiCrAl bond coat, 7 wt % YPSZ top coat.
5. Titania on Alloy 625, NiCrAl bond coat, 24 wt % MSZ top coat.
6. Titania on Grade 2 titanium, NiCrAl bond coat.
7. Titania on Grade 2 or 12 titanium, Grade 5 titanium bond coat.
8. Titania on Alloy 625, Grade 5 titanium bond coat.

Identification of Corrosion Environment. The corrosion environment tested was characterized by oxidation of a cutting fluid known as Trimsol, a trademark of the Master Chemical Corporation, Perrysburg, Ohio. In addition to its primary hydrocarbon constituents, Trimsol contains about 10 wt % chlorine, 1 wt % sulfur, and ½ wt % sodium. As such, upon oxidation a mixture of hydrochloric acid, sulfuric acid, and sodium sulfate will form. (Sodium sulfate is generally stable over sodium chloride at process conditions.) In addition, low levels of the chlorides of cerium, lead, and zinc were introduced to simulate metallic contaminants which might be present in an SCWO process treating mixed organic-radioactive waste. These metals are expected to form oxides or sulfate or chloride salts at process conditions.

Figure 2:
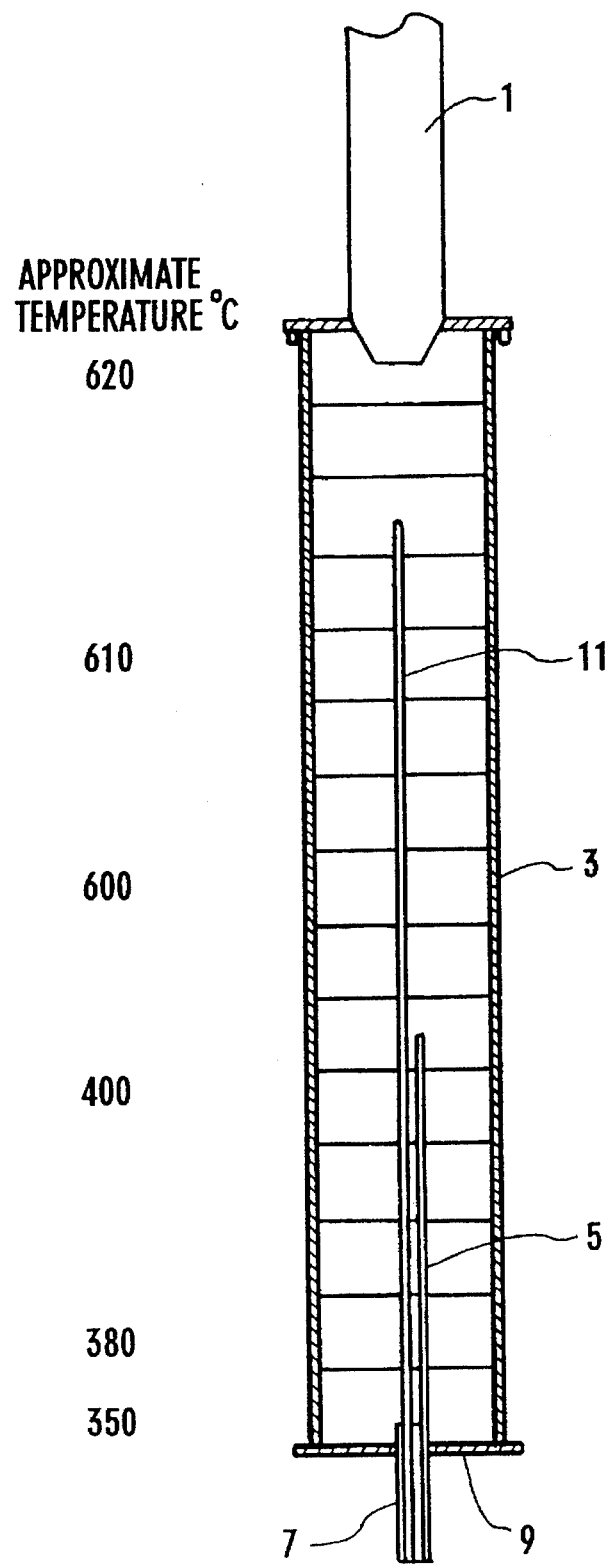
FIG. 2 shows the apparatus containing the ceramic coated rings which was employed for testing the coatings of this invention.

Description of FIG. 2. The eight ceramic composites referenced above were tested in the system set forth in FIG. 2. The equipment depicted was situated within a vessel capable of withstanding high-pressure and high-temperature operation. The system operating pressure was about 3,400 psi. A downward pointing nozzle 1 introduced a mixture of supercritical water, air, metals solution, and Trimsol into chamber 3 defined by fifteen ceramic coated rings. Each ring was 3 inches high and approximately 7 inches in inside diameter. Thermal spray coatings were deposited on the inside surface of each ring. The streams mixed upon leaving nozzle 1 and reaction commenced. A maximum reaction temperature of at least 620° C. was ultimately obtained. Acids, salts and oxides formed within the reaction zone. Some of the salts and oxides adhered to the ceramic coated walls of chamber 3. For the feed rates used in these tests, oxidation of the Trimsol resulted in approximately 8000 mg/kg of HCl, 1600 mg/kg of $H_2SO_4$ and 1200 mg/kg of $Na_2SO_4$ on a gas-free basis (i.e., excluding $N_2$, $O_2$, and $CO_2$). The reacted process stream continued in downflow until it entered the cool-down zone, which was maintained by a separate stream of cold water introduced by tube 5. The cold stream diluted the HCl content from 8000 mg/kg down to about 5000 mg/kg. The process stream continued along its downward path until it reached the approximate location of the exit tube 7. At this point, the process stream mixed with cool dilute sodium hydroxide or sodium bicarbonate entering at the bottom of the chamber 9, and was neutralized. The warm mixed stream exited the chamber through exit pipe 7. The axial temperature profile in the chamber was monitored by thermocouples located within central thermowell 11. The approximate temperatures at several locations along the chamber are indicated in FIG. 2. Temperatures within the chamber did vary somewhat, on a few occasions approaching 700° C. at the upper positions. During some of the test runs, the feeds were deliberately halted and temperatures throughout the chamber brought below 300° C. to cause a thermal cycle.

Table I below is divided into eight subtables—Tables IA through IH—and is a detailed description of the coating compositions of the 36 rings which were tested over the course of several experimental runs, including all thicknesses in inches for all layers.

TABLE IA

BASE METAL ALLOY 625

| Ring No. | Coating Type | NiCrAl Bond | NiCrAl/ 7% YPSZ | 7% YPSZ |
|---|---|---|---|---|
| 1 | 1 | 0.004 | 0.007 | 0.036 |
| 2–5 | 1 | 0.004 | 0.007 | 0.024 |
| 6 | 1 | 0.006 | 0.007 | 0.016 |
| 7 | 1 | 0.006 | 0.008 | 0.013 |

TABLE IB

BASE METAL ALLOY 625

| | | NiCrAl Bond | NiCrAl/ 7% YPSZ | Alumina | 7% YPSZ |
|---|---|---|---|---|---|
| 8 | 2 | 0.004 | 0.007 | 0.013 | 0.016 |
| 9–12 | 2 | 0.004 | 0.006 | 0.007 | 0.015 |
| 13 | 2 | 0.006 | 0.007 | 0.004 | 0.012 |
| 14 | 2 | 0.006 | 0.007 | 0.004 | 0.015 |

TABLE IC

BASE METAL ALLOY 625

| | | NiCrAl Bond | NiCrAl/ $TiO_2$ | $TiO_2$ |
|---|---|---|---|---|
| 15–18 | 3 | 0.004 | 0.005 | 0.015 |
| 19 | 3 | 0.004 | 0.010 | 0.017 |
| 20–21 | 3 | 0.006 | 0.005 | 0.016 |
| 22 | 3 | 0.005 | 0.005 | 0.013 |

TABLE ID

BASE METAL ALLOY 625

| | | NiCrAl Bond | NiCrAl/ $TiO_2$ | $TiO_2$ | 7% YPSZ |
|---|---|---|---|---|---|
| 23–25 | 4 | 0.004 | 0.005 | 0.011 | 0.007 |

TABLE IE

BASE METAL ALLOY 625

|  |  | NiCrAl Bond | NiCrAl/ TiO$_2$ | TiO$_2$ | 24% MSZ |
|---|---|---|---|---|---|
| 6 | 5 | 0.005 | 0.005 | 0.011 | 0.001 |
| 27–28 | 5 | 0.005 | 0.005 | 0.011 | 0.006 |

TABLE IF

BASE METAL GRADE 2 TITANIUM

|  |  | NiCrAl Bond | NiCrAl/ TiO$_2$ | TiO$_2$ |
|---|---|---|---|---|
| 29 | 6 | 0.004 | 0.005 | 0.013 |

TABLE IG

BASE METAL GRADE 2 OR 12 TITANIUM

|  |  | Ti-6Al-4V Bond* | Ti-6Al-4V/ TiO$_2$** | TiO$_2$ |
|---|---|---|---|---|
| 30 | 7 | 0.007 | 0.005 | 0.015 |
| 31–32 | 7 | 0.004 | 0.005 | 0.015 |
| 33–34 | 7 | 0.004 | 0.006 | 0.015 |

*Gr. 5 titanium bond coat containing 90 wt. % Ti, 6% Al, 4% V.
**Cermet comprising 80 wt. % of Gr. 5 titanium bond coat and 20 wt. % of TiO$_2$.

TABLE IH

BASE METAL ALLOY 625

|  |  | Ti-6Al-4V Bond* | Ti-6Al-4V/ TiO$_2$** | TiO$_2$ |
|---|---|---|---|---|
| 35–36 | 8 | 0.004 | 0.006 | 0.015 |

*Gr. 5 titanium bond coat containing 90 wt. % Ti, 6% Al, 4% V.
**Cermet comprising 80 wt. % of Gr. 5 titanium bond coat and 20 wt. % of TiO$_2$.

The coatings were sprayed to have a high density top coat in order to minimize intrusion of foreign material. Intrusion of the salt melts or dense brines which may have been present under the process conditions could have caused coating cracking or spallation when the system was cooled down and the salts solidified. Nevertheless, some porosity was retained in the intermediate ceramic-metal (cermet) layer to accommodate thermal expansion and contraction of the coating system itself. The coatings were designed to be at minimum stress at about 330° C., the midpoint between ambient temperature and the maximum expected exposure temperature of about 650° C. The base metal rings were 0.125 inches thick.

Table 2 presents the exposure data and results for each of the 36 rings tested.

TABLE II

RING EXPOSURE DATA

| Ring No. | Coating Type | Exposure Hours | Temp. °C. | Thermal Cycles | Results |
|---|---|---|---|---|---|
| 1 | 1 | 60 | 630 | 5 | Blistered |
| 2 | 1 | 60 | 620 | 5 | Blistered |
| 3 | 1 | 60 | 610 | 5 | Blistered |
| 4 | 1 | 60 | 520 | 5 | Blistered |
| 5 | 1 | 60 | 450 | 5 | Delamination |
| 6 | 1 | 60 | 620 | 2 | Delamination |
| 7 | 1 | 60 | 390 | 2 | Delamination |
| 8 | 2 | 60 | 630 | 5 | Delamination |
| 9 | 2 | 60 | 620 | 5 | Delamination |
| 10 | 2 | 60 | 580 | 5 | Delamination |
| 11 | 2 | 60 | 510 | 5 | Delamination |
| 12 | 2 | 60 | 400 | 5 | Delamination |
| 13 | 2 | 60 | 610 | 2 | Delamination |
| 14 | 2 | 180 | 350/610 | 6 | Delamination |
| 15 | 3 | 60 | 630 | 5 | Intact, edge attack only |
| 16 | 3 | 120 | 610 | 7 | Delamination |
| 17 | 3 | 240 | 550–590 | 11 | Delamination |
| 18 | 3 | 60 | 500 | 5 | Substantial edge attack |
| 19 | 3 | 60 | 350 | 5 | Intact, edge attack only |
| 20 | 3 | 60 | 620 | 2 | Delamination |
| 21 | 3 | 180 | 410 | 6 | Intact, edge attack only |
| 22 | 3 | 60 | 430 | 2 | Delamination |
| 23 | 4 | 60 | 610 | 2 | Delamination |
| 24 | 4 | 60 | 600 | 2 | Delamination |
| 25 | 4 | 180 | 450 | 6 | Blistered |
| 26 | 5 | 60 | 600 | 2 | Blistered |
| 27 | 5 | 180 | 600 | 6 | Blistered |
| 28 | 5 | 180 | 440 | 6 | Delamination |
| 29 | 6 | 120 | 620 | 4 | Corrosion of cermet and bond coat |
| 30 | 7 | 120 | 620 | 4 | Intact, slight edge attack |
| 31 | 7 | 120 | 610 | 4 | Intact, a few bumps |
| 32 | 7 | 120 | 350 | 4 | Intact, edge attack only |
| 33 | 7 | 120 | 620 | 4 | Intact |
| 34 | 7 | 120 | 390 | 4 | Intact, slight edge attack |
| 35 | 8 | 120 | 620 | 4 | Delamination |
| 36 | 8 | 120 | 380 | 4 | Delamination |

In summary, results for the coating systems were as follows:

1. 7 wt % YPSZ on Alloy 625, Nickel-Chrome-Aluminum (NiCrAl) bond coat: Blistering or delamination between top coat and cermet, and between cermet and bond coat, in all temperature zones within 60 hours and 5 thermal cycles.

2. 7 wt % YPSZ on Alloy 625, NiCrAl bond coat, alumina interlayer: Blistering or delamination between alumina and cermet in all temperature zones within 60 hours and 5 thermal cycles.

3. Titania on Alloy 625, NiCrAl bond coat. Blistering or delamination between top coat and cermet and in the cermet in all temperature zones within 240 hours and 11 thermal cycles.

4. Titania on Alloy 625, NiCrAl bond coat, 7 wt % YPSZ top coat: Blistering or delamination between top coat and titania, and in the cermet, in all temperature zones within 60 hours and 2 thermal cycles.

5. Titania on Alloy 625, NiCrAl bond coat, 24 wt % MSZ top coat: Blistering or delamination between top coat and titania, and in the cermet, in all temperature zones within 60 hours and 2 thermal cycles.

6. Titania on Grade 2 titanium, NiCrAl bond coat: Intact after 120 hours at 550° C. and 4 thermal cycles, but corrosion of the cermet layer and the bond coat expected to lead to eventual coating failure.

7. Titania on Grade 2 or 12 titanium, Grade 5 titanium bond coat: Intact after 120 hours at all temperatures and 4 thermal cycles.

8. Titania on Alloy 625, Grade 5 titanium bond coat: Delamination after 120 hours at 650° C. and 350° C. and 4 thermal cycles.

Microscopic examination indicated cracks perpendicular to the surface for all coatings tested. For the susceptible coatings, these cracks allowed the penetration of corrosive constituents through the ceramic topcoat to the underlying layers where chemical attack occurred on the cermet or bond coat, leading to delamination or blistering. For the titania on titanium system, the cracks appeared to reach the base metal but propagated no further. Presumably the cracks observed under the microscope at room temperature were smaller at operating temperatures due to thermal expansion of the coating.

None of the ceramic compositions utilized appeared particularly prone to chemical attack, although the 240 hour test duration may be insufficient for such corrosion to be evident. It is possible that the zirconium dioxide coatings would provide satisfactory performance when used in conjunction with either titanium or zirconium substrate metal.

The coatings described here were deposited by a thermal spray technique. However, other suitably graded titania on titanium coatings, applied by other methods well known in the art such as diffusion or sol-gel processes, are also within the scope of the present invention.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein.

What is claimed is:

1. A process for high temperature water oxidation of combustible material in a high temperature water oxidation apparatus, in which during at least part of the oxidation, corrosive material is present and contacts the apparatus over a contact area on the apparatus, the process comprising contacting in an aqueous phase the combustible material and an oxidizing agent under conditions suitable to cause oxidation of the combustible material, wherein the oxidation is at a temperature in the range of about 300° C. to about 700° C. and at pressures from about 27.5 bar (400 psi) to about 1000 bar (15,000 psi) and the contact area contains a ceramic composite comprising titanium base metal overlaid with a titania coating, to provide corrosion resistance from said corrosive material in said contact area.

2. The process of claim 1 wherein the corrosive material comprises at least one moiety selected from the group consisting of Cl and $SO_4$ and at least one moiety selected from the group consisting of H and Na.

3. The process of claim 2 wherein the corrosive material comprises (i) at least one selected from the group consisting of HCl, $H_2SO_4$, NaOH, $Na_2CO_3$ and (ii) a sodium salt.

4. The process of claim 1 wherein the aqueous phase containing the corrosive material and oxidizing agent contains greater than 50 mole percent water.

5. The process of claim 4 wherein the aqueous phase further contains oxygen, carbon dioxide, acids, bases and salts.

6. The process of claim 1 wherein the oxidation apparatus is a reactor selected from the group consisting of vessel reactors, hydraulic column reactors, and pipe reactors.

7. The process of claim 1 wherein the titanium base metal is an alloy.

8. The process of claim 1 wherein the titania coating of the ceramic composite consists of multiple layers, each successive layer from the titanium metal substrate having a smaller thermal coefficient.

9. The process of claim 1 wherein the contact area further comprises a metallic bond coat between the titanium base metal and the overlying titania.

10. The process of claim 9 wherein the metallic bond coat contains titanium.

11. The process of claim 9 wherein the ceramic composite further comprises a cermet consisting of titanium dioxide and titanium between the metallic bond coat and the overlying titania.

12. The process of claim 11 wherein the titanium of the cermet is an alloy.

13. The process of claim 1 wherein the coating of the ceramic composite is applied onto the titanium base metal by thermal spraying of the titania.

14. A process of oxidizing combustible materials containing corrosive constituents in an oxidation apparatus in which an aqueous phase containing the oxidizable combustible material and oxidizing agent is contacted with at least a portion of a contact area of the apparatus under conditions suitable to cause oxidation of the combustible material, at a temperature of at least about 300° C. and a pressure of at least about 27.5 bar, wherein said corrosive constituents are present in said contact area, and wherein the contact area contains a ceramic composite consisting of titanium dioxide coated onto a titanium metal substrate to provide corrosion resistance from said corrosive constituents in said contact area.

15. The process of claim 14 wherein the oxidation is conducted at a temperature in the range of about 300° C. to about 700° C.

16. The process of claim 15 wherein the oxidation is conducted at a pressure within the range of from about 27.5 bar (400 psi) to about 1,000 bar (15,000 psi).

17. The process of claim 14 wherein the titanium dioxide coating of the ceramic composite consists of multiple layers, each successive layer from the titanium metal substrate having a smaller thermal coefficient.

18. The process of claim 14 wherein the contact area further comprises a metallic bond coat between the titanium base metal and the overlying cermet, wherein the cermet consists of titanium dioxide and titanium and further wherein the cermet is between the metallic bond coat and the overlying titania.

19. A process for oxidizing combustible material in a water oxidation apparatus, in which during at least part of the oxidation, corrosive material is present and contacts the apparatus over a contact area on the apparatus, the process comprising contacting in an aqueous phase the combustible material and an oxidizing agent under conditions suitable to cause oxidation of the combustible material at a temperature of at least about 300° C. and a pressure of at least about 27.5 bar, wherein the contact area contains a ceramic composite comprising titanium base metal overlaid with a titania coating, to provide corrosion resistance from said corrosive material in said contact area.

20. The process of claim 19 wherein the titania coating of the ceramic composite consists of multiple layers, each successive layer from the titanium metal substrate having a smaller thermal coefficient.

* * * * *

UNITED STATES PATENT AND TRADEMARK OFFICE
CERTIFICATE OF CORRECTION

PATENT NO. : 5,545,337
DATED : August 13, 1996
INVENTOR(S) : Glenn T. Hong

It is certified that error appears in the above-indentified patent and that said Letters Patent is hereby corrected as shown below:

Title page, item [54] and col. 1, line 2;

The title should read -- CERAMIC COATING SYSTEM FOR WATER OXIDATION ENVIRONMENTS --.

Signed and Sealed this

Twenty-fourth Day of December, 1996

Attest:

BRUCE LEHMAN

*Attesting Officer*       *Commissioner of Patents and Trademarks*